United States Patent
Tytula et al.

(10) Patent No.: US 9,258,128 B1
(45) Date of Patent: Feb. 9, 2016

(54) SYSTEMS AND METHODS FOR CREATING CUSTOMER-SPECIFIC TOOLS FOR GENERATING CERTIFICATE SIGNING REQUESTS

(71) Applicant: Symantec Corporation, Mountain View, CA (US)

(72) Inventors: Andrew Tytula, Mountain View, CA (US); Padam Singal, Fremont, CA (US); Ishita Verma, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 50 days.

(21) Appl. No.: 14/016,017

(22) Filed: Aug. 30, 2013

(51) Int. Cl.
*H04L 9/32* (2006.01)

(52) U.S. Cl.
CPC .................................... *H04L 9/3263* (2013.01)

(58) Field of Classification Search
CPC ..................................................... H04L 9/3263
USPC ......................................................... 713/156
See application file for complete search history.

(56) References Cited

U.S. PATENT DOCUMENTS

| | | | | |
|---|---|---|---|---|
| 8,195,934 | B1* | 6/2012 | Lawrence | 713/156 |
| 8,560,851 | B1* | 10/2013 | Cherukumudi et al. | 713/169 |
| 2001/0054004 | A1* | 12/2001 | Powers | 705/14 |
| 2003/0126131 | A1* | 7/2003 | Cihula | H04L 9/3263 |
| 2003/0126431 | A1* | 7/2003 | Beattie et al. | 713/156 |
| 2006/0075466 | A1* | 4/2006 | Ramanathan et al. | 726/1 |
| 2006/0129804 | A1* | 6/2006 | Satkunanathan et al. | 713/156 |
| 2006/0143442 | A1* | 6/2006 | Smith | H04L 63/0823 713/156 |
| 2007/0061567 | A1* | 3/2007 | Day et al. | 713/159 |
| 2007/0186098 | A1* | 8/2007 | Lingmann | 713/158 |
| 2009/0092247 | A1* | 4/2009 | Kido et al. | 380/30 |
| 2010/0131857 | A1* | 5/2010 | Prigge | 715/744 |
| 2011/0113240 | A1* | 5/2011 | Fu et al. | 713/156 |
| 2011/0145567 | A1* | 6/2011 | Liu et al. | 713/156 |
| 2011/0161659 | A1* | 6/2011 | Himawan | G06F 21/33 713/156 |
| 2011/0208962 | A1* | 8/2011 | Andrews | 713/156 |
| 2012/0030469 | A1* | 2/2012 | Hsueh et al. | 713/175 |
| 2012/0131062 | A1* | 5/2012 | Kaisermayr | 707/803 |
| 2013/0311779 | A1* | 11/2013 | Sherkin et al. | 713/175 |

OTHER PUBLICATIONS

Symantec Corporation, "Symantec Trust Center Enterprise Account", http://www.symantec.com/content/en/us/enterprise/fact_sheets/b-trust-center-account-DS.en-us.pdf, as accessed May 16, 2013, (2012).

* cited by examiner

*Primary Examiner* — Joseph P Hirl
*Assistant Examiner* — J. Brant Murphy
(74) *Attorney, Agent, or Firm* — ALG Intellectual Property, LLC

(57) ABSTRACT

A method for creating customer-specific tools for generating certificate signing requests may include (1) identifying a request from a customer for a tool for generating a certificate signing request for a digital certificate, (2) creating, in response to the request, a customer-specific version of the tool that is unique to the customer by injecting information into the customer-specific version of the tool that (a) uniquely identifies the customer and (b) identifies a desired encryption algorithm for the digital certificate and/or a desired certificate authority for the digital certificate, (3) configuring the customer-specific version of the tool to generate the certificate signing request using the injected information, and (4) providing the customer-specific version of the tool to the customer to enable the customer to generate, using the customer-specific version of the tool, the certificate signing request without having to manually provide the injected information.

20 Claims, 6 Drawing Sheets

SYSTEMS AND METHODS FOR CREATING CUSTOMER-SPECIFIC TOOLS FOR GENERATING CERTIFICATE SIGNING REQUESTS

BACKGROUND

When a customer purchases a digital certificate (such as a digital certificate for a web server), the customer may be required to generate a certificate signing request that follows a very specific format and/or includes very specific information. While there are tools available for simplifying this process, these tools may still require the customer to manually input or provide a variety of information, such as the customer's distinguished name, common name, mailing address, email address, and/or a desired encryption algorithm for the digital certificate. Unfortunately, this manual process may lead to mistakes and/or discrepancies (such as when different individuals complete various stages of this process) that may prevent the customer from successfully ordering, installing, and/or using the desired digital certificate.

As such, the instant disclosure identifies and addresses a need for a more efficient and effective mechanism for generating certificate signing requests.

SUMMARY

As will be described in greater detail below, the instant disclosure generally relates to systems and methods for creating customer-specific tools capable of automatically generating certificate signing requests and/or installing digital certificates without customer input or direction. In one example, a computer-implemented method for creating customer-specific tools for generating certificate signing requests may include (1) identifying a request from a customer for a tool for generating a certificate signing request for a digital certificate, (2) creating, in response to the request, a customer-specific version of the tool that is unique to the customer by injecting information into the customer-specific version of the tool that (a) uniquely identifies the customer and (b) identifies a desired encryption algorithm for the digital certificate and/or a desired certificate authority for the digital certificate, (3) configuring the customer-specific version of the tool to generate the certificate signing request using the injected information, and then (4) providing the customer-specific version of the tool to the customer to enable the customer to generate, using the customer-specific version of the tool, the certificate signing request without having to manually provide the injected information.

In some examples, identifying the request from the customer for the tool may include (1) receiving a request from the customer to purchase the digital certificate and/or (2) receiving a request from the customer to download the tool. In addition, injecting the information into the customer-specific version of the tool may include (1) injecting the information into an executable file of the customer-specific version of the tool and/or (2) storing the information in a configuration file included with the customer-specific version of the tool provided to the customer.

In one embodiment, the computer-implemented method may also include, prior to creating the customer-specific version of the tool, identifying the information that uniquely identifies the customer by (1) retrieving at least a portion of the information from a customer database and/or (2) requesting and receiving the information from the customer in response to receiving a request from the customer to purchase the digital certificate and/or download the tool.

The computer-implemented method may also include, prior to creating the customer-specific version of the tool, identifying the desired encryption algorithm for the digital certificate by (1) ascertaining the desired encryption algorithm for the digital certificate from the customer's purchase history and/or (2) requesting and receiving an identification of the desired encryption algorithm for the digital certificate from the customer in response to receiving a request from the customer to purchase the digital certificate and/or download the tool.

In one embodiment, the computer-implemented method may also include, prior to creating the customer-specific version of the tool, identifying the desired certificate authority for the digital certificate by (1) ascertaining the desired certificate authority from a web portal chosen by the customer when submitting the request for the tool and/or (2) ascertaining the desired certificate authority from a version of the tool requested by the customer.

The computer-implemented method may also include, upon creation of the digital certificate, (1) identifying an additional request from the customer for an additional tool for installing the digital certificate, (2) creating, in response to the additional request, a customer-specific version of the additional tool that is unique to the customer and that includes the digital certificate, (3) configuring the customer-specific version of the additional tool to install the digital certificate using the included digital certificate, and (4) providing the customer-specific version of the additional tool to the customer to enable the customer to install, using the customer-specific version of the additional tool, the digital certificate without having to manually locate the digital certificate. In one embodiment, the tool for generating the certificate signing request and the additional tool for installing the digital certificate may represent the same tool.

In one embodiment, a system for implementing the above-described method may include a tool creation module that creates, in response to the request, a customer-specific version of the tool that is unique to the customer by injecting information into the customer-specific version of the tool that (1) uniquely identifies the customer and (2) identifies a desired encryption algorithm for the digital certificate and/or a desired certificate authority for the digital certificate. The system may also include a tool configuration module that configures the customer-specific version of the tool to generate the certificate signing request using the injected information. In addition, the system may include a communication module that provides the customer-specific version of the tool to the customer to enable the customer to generate, using the customer-specific version of the tool, the certificate signing request without having to manually provide the injected information. The system may also include at least one processor configured to execute the identification module, the tool creation module, the tool configuration module, and the communication module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request from a customer for a tool for generating a certificate signing request for a digital certificate, (2) create, in response to the request, a customer-specific version of the tool that is unique to the customer by injecting information into the customer-specific version of the tool that (a) uniquely identifies the customer and (b) identifies a desired encryption algorithm for the digital certificate and/or a desired certificate authority for the digital certificate, (3) configure the customer-specific version of the tool to generate the certificate signing request using the injected information, and then (4) provide the customer-specific version of the tool to the customer to enable the customer to generate, using the customer-specific version of the tool, the certificate signing request without having to manually provide the injected information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
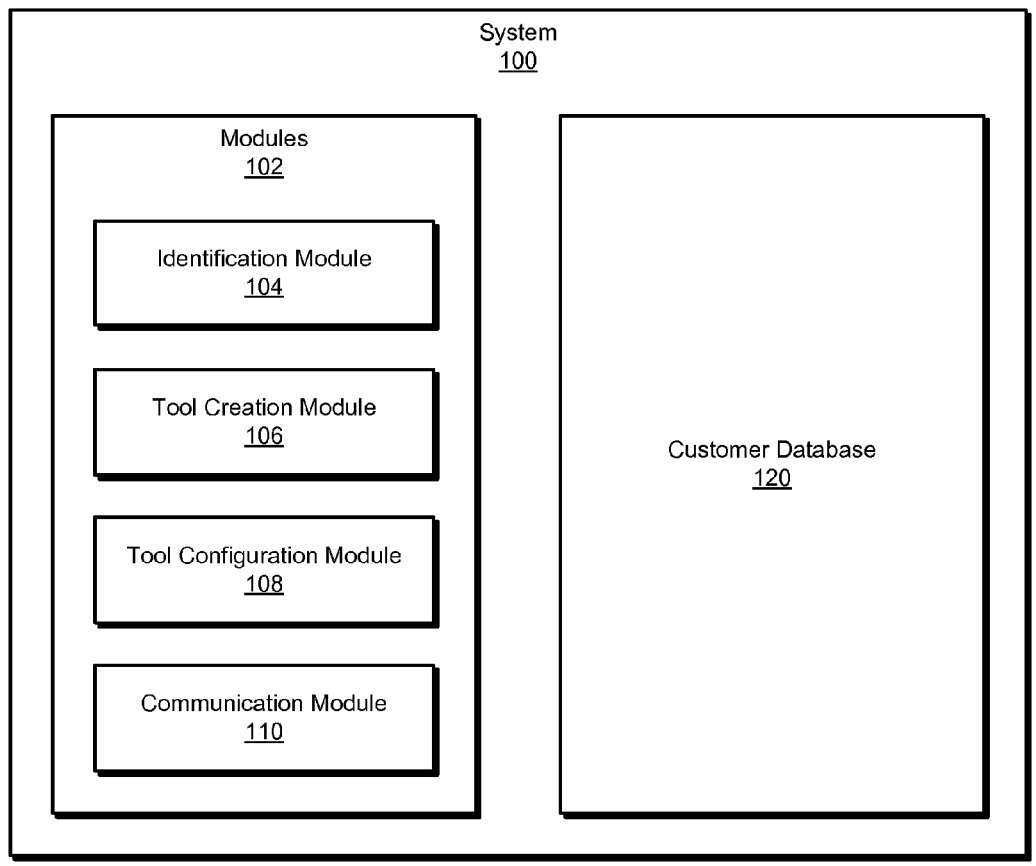
FIG. 1 is a block diagram of an exemplary system for creating customer-specific tools for generating certificate signing requests and/or installing digital certificates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for creating customer-specific tools for generating certificate signing requests and/or installing digital certificates. As will be explained in greater detail below, by injecting customer-specific information and/or purchased digital certificates into these tools, the systems and methods described herein may enable customers to generate certificate signing requests and/or install digital certificates without having to manually input or provide any additional information or direction. This may in turn reduce the potential for customer error and information discrepancies, decrease the amount of time required to generate certificate signing requests and install digital certificates, provide a simple, streamlined experience for the customer, and/or increase customer satisfaction.

Figure 2:
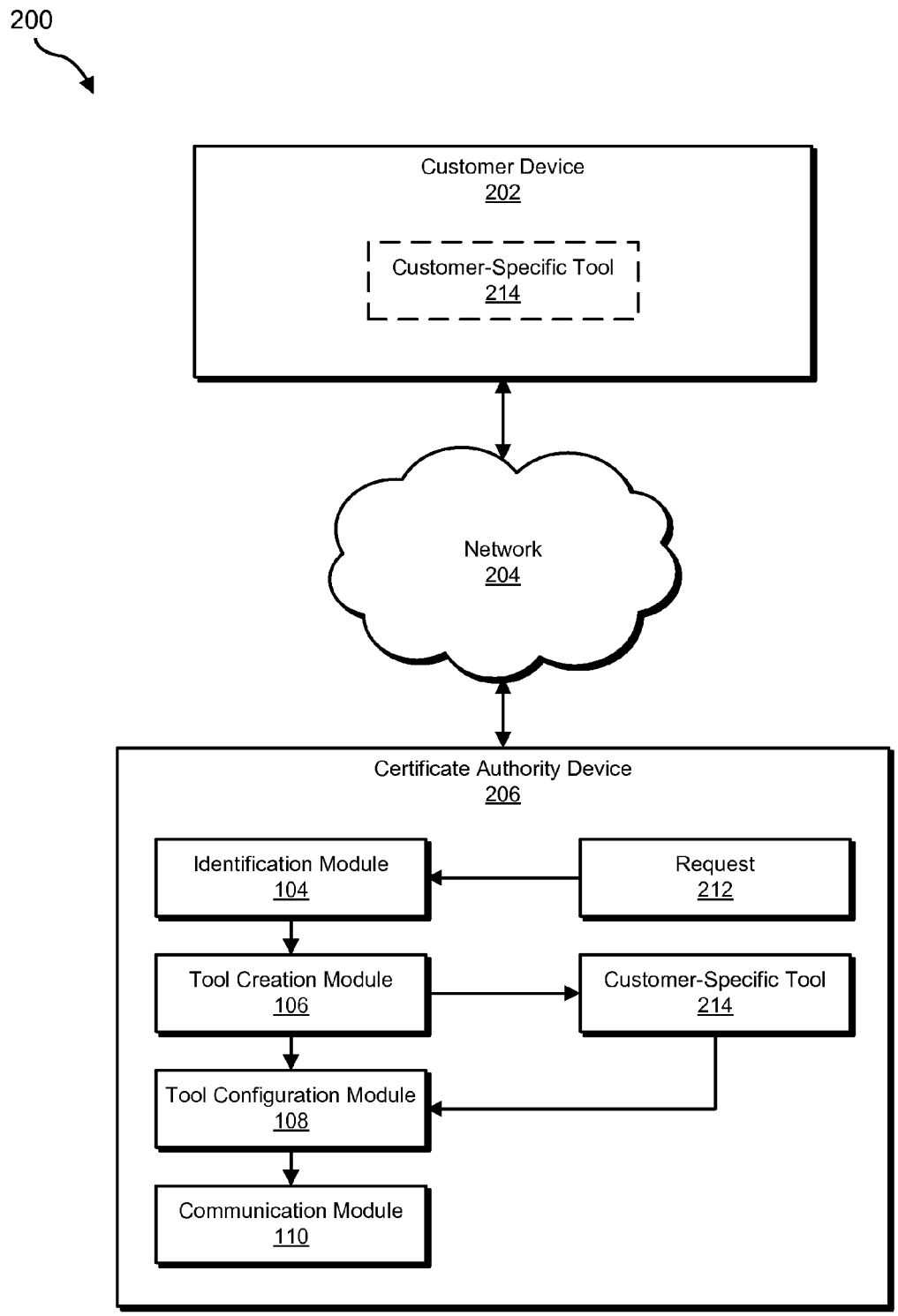
FIG. 2 is a block diagram of an exemplary system for creating customer-specific tools for generating certificate signing requests and/or installing digital certificates.

The following will provide, with reference to FIGS. 1-2, detailed descriptions of exemplary systems for creating customer-specific tools for generating certificate signing requests and/or installing digital certificates. Detailed descriptions of corresponding computer-implemented methods will also be provided in connection with FIGS. 3, 4A, and 4B. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for creating customer-specific tools for generating certificate signing requests and/or installing digital certificates. As illustrated in this figure, exemplary system 100 may include one or more modules 102 for performing one or more tasks. For example, and as will be explained in greater detail below, exemplary system 100 may include an identification module 104 that may identify a request from a customer for a tool for generating a certificate signing request for a digital certificate. Exemplary system 100 may additionally include a tool creation module 106 that may create, in response to the request, a customer-specific version of the tool that is unique to the customer by injecting customer-specific information into the customer-specific version of the tool.

Exemplary system 100 may also include a tool configuration module 108 that may configure the customer-specific version of the tool to generate the certificate signing request using the injected information. In addition, exemplary system 100 may include a communication module 110 that may provide the customer-specific version of the tool to the customer to enable the customer to generate, using the customer-specific version of the tool, the certificate signing request without having to manually provide the injected information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., customer device 202 and/or certificate authority device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as customer database 120. In one example, customer database 120 may be configured to store unique (i.e., customer-specific) information about customers. In some embodiments, this unique information may be used to generate certificate signing requests or create tools for generating certificate signing requests. In one embodiment, customer database 120 may be a database located on certificate authority device 206 or on any other computing device accessible by certificate authority device

206. In some examples, customer database 120 may be a database maintained by the certificate authority and may store customer information based on prior purchases made by the customer. For example, customer database 120 may store the distinguished names (i.e., common names), preferred encryption algorithms, contact information, etc., of all customers who have purchased digital certificates in the past.

Customer database 120 may represent portions of a single database or computing device or a plurality of databases or computing devices. For example, customer database 120 may represent a portion of certificate authority device 206 in FIG. 2, computing system 510 in FIG. 5, and/or portions of exemplary network architecture 600 in FIG. 6. Alternatively, customer database 120 in FIG. 1 may represent one or more physically separate devices capable of being accessed by a computing device, such as certificate authority device 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a customer device 202 in communication with a certificate authority device 206 via a network 204. Customer device 202 may be programmed with one or more of modules 102 and/or may store all or a portion of the data in customer database 120. Additionally or alternatively, certificate authority device 206 may be programmed with one or more of modules 102 and/or may store all or a portion of the data in customer database 120.

In one embodiment, one or more of modules 102 from FIG. 1 may, when executed by at least one processor of customer device 202 and/or certificate authority device 206, facilitate customer device 202 and/or certificate authority device 206 in creating customer-specific tools for generating certificate signing requests and/or installing digital certificates. For example, and as will be described in greater detail below, identification module 104 may cause certificate authority device 206 to identify a request from a customer (e.g., request 212) for a tool for generating a certificate signing request for a digital certificate. Tool creation module 106 may then cause certificate authority device 206 to create, in response to the request, a customer-specific version of the tool (e.g., customer-specific tool 214) that is unique to the customer by injecting information into the customer-specific version of the tool that (1) uniquely identifies the customer and (2) identifies a desired encryption algorithm and/or a desired certificate authority for the digital certificate. Tool configuration module 108 may then cause certificate authority device 206 to configure the customer-specific version of the tool to generate the certificate signing request using the injected information. Finally, communication module 110 may cause certificate authority device 206 to provide the customer-specific version of the tool to the customer to enable the customer to generate, using the customer-specific version of the tool, the certificate signing request without having to manually provide the injected information.

Customer device 202 generally represents any type or form of computing device capable of reading computer-executable instructions. Examples of customer device 202 include, without limitation, laptops, tablets, desktops, servers (such as web servers), cellular phones, Personal Digital Assistants (PDAs), multimedia players, embedded systems, combinations of one or more of the same, exemplary computing system 510 in FIG. 5, or any other suitable computing device.

Certificate authority device 206 generally represents any type or form of computing device that is capable of generating and/or providing customer-specific tools for generating certificate signing requests and/or installing digital certificates. Examples of certificate authority device 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between customer device 202 and certificate authority device 206.

Figure 3:
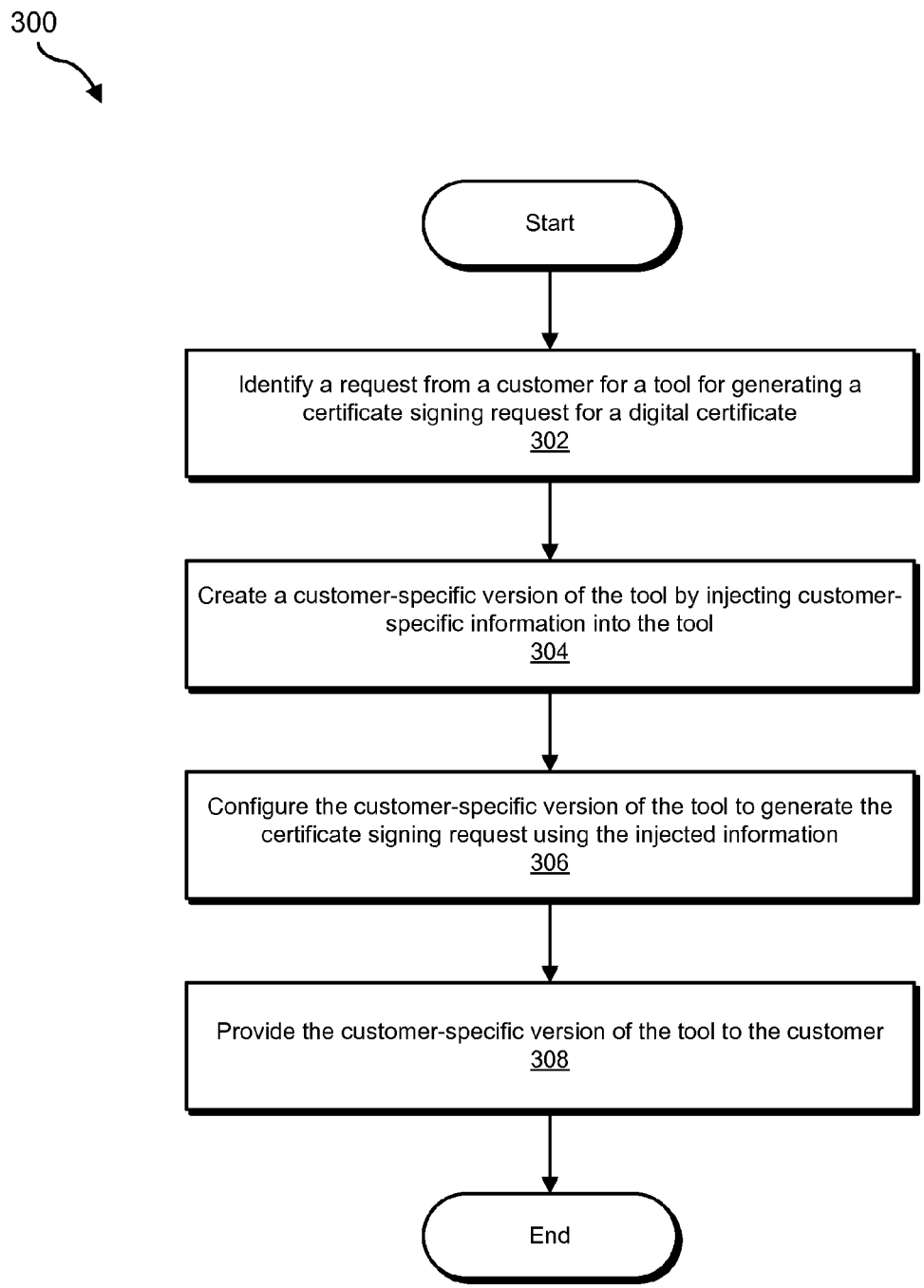
FIG. 3 is a flow diagram of an exemplary method for creating customer-specific tools for generating certificate signing requests.

FIG. 3 is a flow diagram of an exemplary computer-implemented method 300 for creating customer-specific tools for generating certificate signing requests. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request from a customer for a tool for generating a certificate signing request for a digital certificate. For example, identification module 104 may, as part of certificate authority device 206 in FIG. 2, identify a request 212 from a customer using customer device 202 for a tool for generating a certificate signing request for a digital certificate.

The phrase "digital certificate," as used herein, generally refers to any type or form of electronic document used to verify the identity of an entity. In some examples, digital certificates may accomplish this by using a digital signature (from, e.g., a certificate authority) to bind the public half of an asymmetric cryptographic key pair associated with an entity with information that uniquely identifies the entity. Examples of digital certificates include, without limitation, web server certificates, such as Transport Layer Security (TSL) certificates, Secure Socket Layer (SSL) certificates, Extended Validation SSL (EV SSL) certificates, etc. When installed on a web server, digital certificates may allow for secure connections between a web server and a browser, such as via the Hypertext Transfer Protocol Secure (HTTPS) protocol.

Similarly, the phrase "certificate signing request," as used herein, generally refers to any kind of request or message sent from an applicant (i.e., customer) to a certificate authority in order to apply for a digital certificate. Certificate signing requests may contain a variety of information. For example, a certificate signing request may contain information that uniquely identifies a customer, such as the customer's distinguished name, the customer's contact information, the customer's address or location, or any other type, kind, or combination of information, credentials, or proofs required to identify a customer. Certificate signing requests may also include the public half of an asymmetric cryptographic key pair associated with a customer (the private half of which may be maintained in secret by the customer). In some examples, a certificate authority may bind this public cryptographic key provided by the customer with information that uniquely identifies the customer in a digital certificate that verifies the identity of the customer by digitally signing the same using the private half of an asymmetric cryptographic key associated with the certificate authority (the other half for which is made public).

In addition, the term "customer," as used herein, may refer to any of a variety of parties interested in obtaining and/or purchasing a digital certificate. For example, the term "customer" may refer to any person, employee, purchaser, applicant, company, organization, department, or other person or group of people responsible for or interested in generating a certificate signing request and/or purchasing digital certificates. The term "customer" may also refer to any person using, operating, or responsible for customer device 202.

The systems described herein may perform step 302 in a variety of ways. In one example, the systems described herein may receive an explicit request from the customer for the tool. For example, identification module 104 may receive a request (e.g., prior to and/or during a digital certificate purchase process) from a customer using customer device 202 to download the tool. In another example, the systems described herein may identify the request as part of an action or request that inherently or necessarily implicates a request for the tool. For example, identification module 104 may receive a request from a customer using customer device 202 to purchase a digital certificate. In this example, identification module 104 may determine that this purchase request inherently includes a request for, or otherwise necessitates the need for, the tool.

As illustrated in FIG. 3, at step 304 the systems described herein may create, in response to the request, a customer-specific version of the tool by injecting a variety of customer-specific information into the tool, such as information that uniquely identifies the customer, a desired encryption algorithm for the digital certificate, and/or a desired certificate authority for the digital certificate. For example, tool creation module 106 may, as part of certificate authority device 206 in FIG. 2, create customer-specific tool 214.

Within the instant disclosure, the phrase "customer-specific version" generally refers to an instance of a tool for generating certificate signing requests and/or installing digital certificates that is unique to a customer and/or that contains information that is unique to or about a customer. Similarly, the phrase "customer-specific information," as used herein, generally refers to any type or kind of information that is suitable for use in generating a certificate signing request for a digital certificate for a customer. Examples of customer-specific information include, without limitation, information that uniquely identifies a customer (such as the customer's distinguished name, common name, mailing address, email address, and/or any other information required to generate a certificate signing request), information that identifies a certificate authority desired by the customer (e.g., VERISIGN, THAWTE, GEOGTRUST, etc.), information that identifies an encryption algorithm desired by the customer (e.g., Elliptic Curve Cryptography (ECC), Digital Signature Algorithm (DSA), Rivest-Shmir-Adleman (RSA), etc.), information that identifies an encryption bit length desired by the customer, and/or any other type of information that may be used to create, and/or that may be included within, a certificate signing request.

Figure 4A:
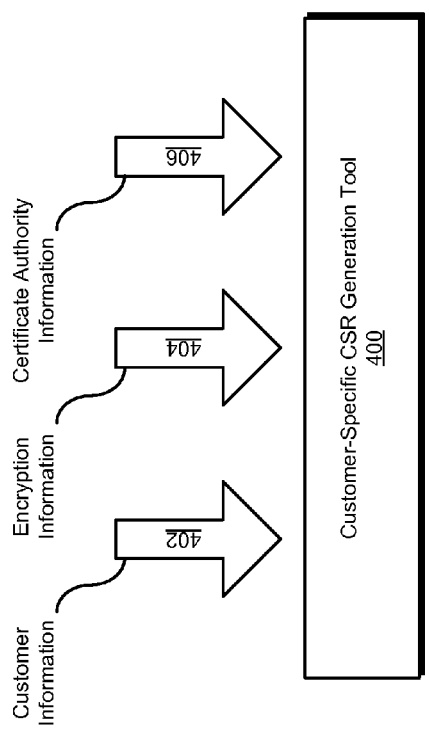
FIG. 4A is a block diagram of an exemplary process for creating customer-specific tools for generating certificate signing requests.

FIG. 4A is a block diagram of an exemplary process for creating customer-specific tools for generating certificate signing requests. As illustrated in this figure, tool creation module 106 may create a customer-specific certificate signing request (CSR) generation tool 400 by injecting customer information 402, encryption information 404, and certificate authority information 406 into the same. In this example, customer information 402 may uniquely identify the customer (using, e.g., the customer's distinguished or common name), encryption information 404 may identify the encryption algorithm and/or encryption bit length desired by the customer (e.g., RSA), and customer authority information 406 may identify the name of the certificate authority from which the customer desires the digital certificate to be issued (e.g., VERISIGN).

The systems described herein may perform step 304 in a variety of ways. In one example, the systems described herein may inject the information directly into an executable file associated with the customer-specific version of the tool. For example, tool creation module 106 may inject customer-specific information directly into the executable file of customer-specific tool 214.

Additionally or alternatively, the systems described herein may store the information in a configuration file included with the customer-specific version of the tool provided to the customer. For example, tool creation module 106 may store customer-specific information in a configuration file packaged with the executable file of customer-specific tool 214 (using, for example, a compressed file format, such as .zip). Alternatively, tool creation module 106 may store this customer-specific information in a separate configuration file provided as a stand-alone download apart from customer-specific tool 214. In either example, and as will be described in greater detail below, customer-specific tool 214 may automatically open and extract the customer-specific information stored in this configuration file upon execution, and/or prompt the customer to point to, open, or select the downloaded configuration file upon execution.

The systems described herein may obtain the information to be injected in step 304 in any of a variety of ways. In one example, the systems described herein may obtain information that uniquely identifies the customer by retrieving at least a portion of the same from a customer database. For example, a customer using customer device 202 may have previously purchased and installed a digital certificate. In this example, the customer-specific information based on that purchase may be stored in customer database 120, and identification module 104 may retrieve that information to identify information that uniquely identifies the customer.

In another example, the systems described herein may obtain the information that uniquely identifies the customer by requesting and receiving the same from the customer in response to receiving (1) a request from the customer to purchase the digital certificate and/or (2) a request from the customer to download the tool. For example, a customer using customer device 202 may submit a request to purchase a digital certificate and/or download a tool for generating certificate signing requests. Identification module 104 may, in response to receiving either request, prompt the customer for its organization's details and/or any other information that may be required to complete these requests.

In some embodiments, the systems described herein may also identify an encryption algorithm that the customer desires to be used when creating the digital certificate by ascertaining the same from the customer's purchase history. For example, a customer using customer device 202 may have already purchased two digital certificates—one that uses RSA encryption and one that uses ECC encryption. The details of this purchase, including the algorithms used, may have been stored in customer database 120. In this example, identification module 104 may determine, based on the information identifying the customer's past purchases stored in database 120, that the desired encryption algorithm is an algorithm not yet used by the customer (in this example, DSA).

The systems described herein may also identify the encryption algorithm desired by the customer by requesting and receiving the same from the customer in response to receiving (1) a request from the customer to purchase the digital certificate and/or (2) a request from the customer to download the tool. For example, a customer using customer device 202 may submit a request to purchase a certificate or download a certificate signing request generation tool. In this example, identification module 104 may, in response to receiving either request, prompt the customer for the desired encryption algorithm.

The systems described herein may also identify a certificate authority from which the customer desires the digital certificate to be issued by ascertaining the same from (1) a web portal chosen by the customer when submitting a request for the tool and/or (2) a version of the tool requested by the customer. For example, if the customer submits a request for a tool via www.verisign.com (or a sub-domain associated with the same, such as a knowledge base article hosted at www.verisign.com), then identification module 104 may determine that the customer desires the digital certificate to be issued by VERISIGN (as opposed to GEOTRUST or THAWTE). Similarly, if the customer submits a request to download a VERISIGN-branded tool (from, e.g., a VERISIGN-branded knowledge base article), then identification module 104 may determine that the customer desires the digital certificate to be issued by the certificate authority associated with the tool (VERISIGN, in this example).

In some examples, tool creation module 106 may verify and/or authenticate this customer-provided information (using, e.g., customer database 120) before injecting the same into customer-specific tool 214. In other examples, however, tool creation module 106 may simply auto-populate customer-specific tool 214 with this customer-provided information without verifying and/or otherwise authenticating the same.

Returning to FIG. 3, at step 306 the systems described herein may configure the customer-specific version of the tool to generate the certificate signing request using the injected information. For example, tool configuration module 108 may, as part of certificate authority device 206 in FIG. 2, configure customer-specific tool 214 to generate a certificate signing request using the information injected in step 304.

The systems described herein may perform step 306 in a variety of ways. For example, if tool creation module 106 injected the customer-specific information into a separate configuration file in step 304, then tool configuration module 108 may configure customer-specific tool 214 to automatically open and extract the customer-specific information stored in this separate configuration file upon execution, and/or prompt the customer to point to, open, or select the downloaded configuration file upon execution. Alternatively, if tool creation module 106 injected the customer-specific information directly into the executable file of customer-specific tool 214 in step 304, then tool configuration module 108 may configure customer-specific tool 214 to utilize this injected information during execution.

In some examples, tool configuration module 108 may configure customer-specific tool 214 to generate the certificate signing request without prompting or otherwise requiring the customer to manually input or provide any additional information. In other words, because customer-specific tool 214 may already contain the information necessary to generate the customer's certificate signing request (per the injection process outlined in step 304), customer-specific tool 214 may generate the certificate signing request without requiring the customer to enter or provide any additional information or direction, effectively resulting in a "one-click" process.

At step 308, the systems described herein may provide the customer-specific version of the tool to the customer to enable the customer to generate, using the customer-specific version of the tool, the certificate signing request without having to manually provide the injected information. For example, communication module 110 may, as part of certificate authority device 206 in FIG. 2, provide customer-specific tool 214 to the customer using customer device 202 to enable the customer to generate the desired certificate signing request.

The systems described herein may perform step 308 in a variety of ways. In one example, communication module 110 may provide customer-specific tool 214 to the customer prior to, during, and/or upon completion of a purchase process for the desired digital certificate. In other examples, communication module 110 may provide customer-specific tool 214 to the customer immediately upon creation of the same. As detailed above, in some examples customer-specific tool 214 may generate the customer's certificate signing request without prompting or otherwise requiring the customer to manually input or provide any additional information or direction.

Although the prior description has primarily focused on creating customer-specific tools for generating certificate signing requests, the systems and methods described herein may also be used to create customer-specific versions of tools for installing digital certificates. An example of a process for doing so may include (1) identifying a request from a customer for a tool for installing a digital certificate, (2) creating, in response to the request, a customer-specific version of the tool that is unique to the customer and that includes the digital certificate, (3) configuring the customer-specific version of the tool to install the digital certificate using the included digital certificate, and then (4) providing the customer-specific version of the tool to the customer to enable the customer to install, using the customer-specific version of the additional tool, the digital certificate without having to manually locate the digital certificate.

Figure 4B:
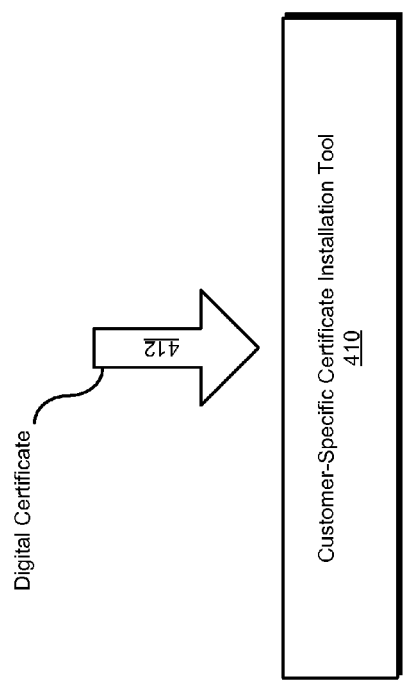
FIG. 4B is a block diagram of an exemplary process for creating customer-specific tools for installing digital certificates.

For example, identification module 104 may receive a request from a customer using customer device 202 (e.g., during or upon completion of a purchase process for a digital certificate) to download a tool for installing a purchased digital certificate. As illustrated in FIG. 4B, tool creation module 106 may then create a customer-specific certificate installation tool 410 that includes the purchased digital certificate (e.g., digital certificate 412). Tool configuration module 108 may then configure customer-specific certificate installation tool 410 to install digital certificate 412 without prompting or otherwise requiring the customer to manually locate the same. Finally, communication module 110 may provide customer-specific certificate installation tool 410 to the customer using customer device 202.

In some examples, customer-specific tool 214 may be capable of both generating certificate signing requests and installing digital certificates (i.e., customer-specific CSR generation tool 400 and customer-specific certificate installation tool 410 may represent portions of the same tool). In other examples, however, customer-specific CSR generation tool 400 and customer-specific certificate installation tool 410 may represent separate and discrete tools.

As explained above in connection with method 300 in FIG. 3, when a customer purchases a web server certificate (such as an SSL certificate), the customer may be required to generate both a certificate signing request and a private/public cryptographic key pair on their web server. Each web server brand (e.g., APACHE, MICROSOFT, (PLANET, etc.) typically has its own unique steps that must be followed to generate this certificate signing request and key pair and/or later install the resulting digital certificate. While there are tools available for simplifying this process, these tools may still require the customer to enter their organization's details and desired encryption algorithm and/or to identify the location of the digital certificate to install, which may lead to mistakes. The instant disclosure may overcome this by injecting customer data into a configuration file included with the tool and/or by injecting customer data directly into the tool's executable file. This configuration file and/or the purchased digital certificate may be bundled with the tool by the certificate authority, resulting in a unique version of the tool that the certificate authority then provides to the customer. As detailed above, this unique version may not prompt the customer for their organization's details, desired encryption algorithm, and/or location of the purchased digital certificate, but may instead generate the desired certificate signing request and/or install the desired digital certificate without any further customer input or direction. This may in turn reduce the potential for customer error and information discrepancies, decrease the amount of time required to generate certificate signing requests and install digital certificates, provide a simple, streamlined experience for the customer, and/or increase customer satisfaction.

Figure 5:
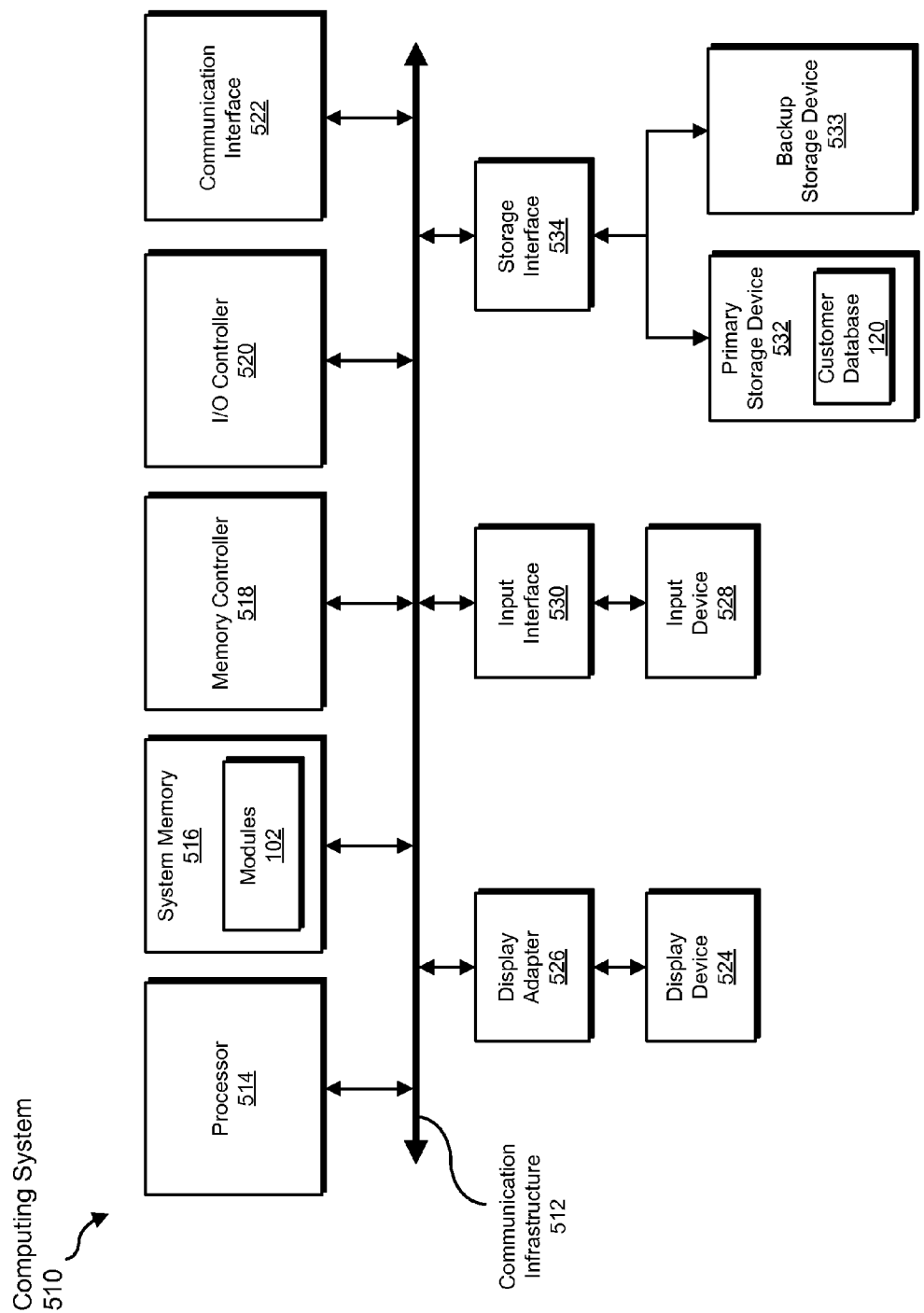
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, customer database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
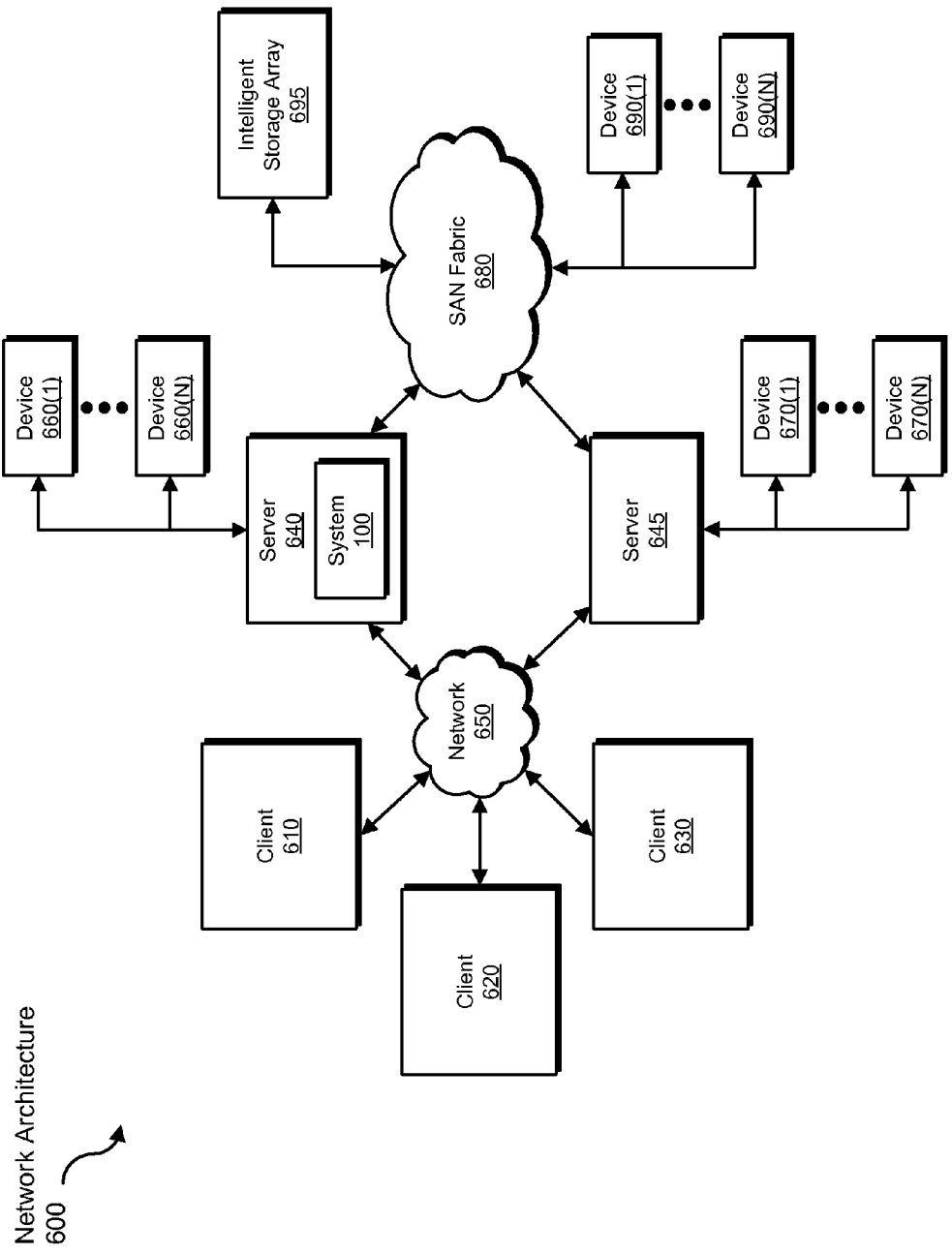
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for creating customer-specific tools for generating certificate signing requests.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a customer-agonistic tool for generating certificate signing requests and/or installing digital certificates into a customer-specific tool that is unique to the customer in question. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating customer-specific tools for generating certificate signing requests, at least a portion of the method being performed by a computing device comprising at least one processor, the method comprising:
    identifying a request from a customer for a tool for generating a certificate signing request for a digital certificate;
    creating, in response to the request, a customer-specific version of the tool that is unique to the customer by injecting information that is necessary to generate the certificate signing request into an executable file of the customer-specific version of the tool, wherein the information:
    uniquely identifies the customer; and
    identifies at least one of a desired encryption algorithm for the digital certificate and a desired certificate authority for the digital certificate;
    configuring the customer-specific version of the tool to generate the certificate signing request using the injected information; and
    providing, to the customer, the customer-specific version of the tool that already contains the injected information necessary to generate the certificate signing request to enable the customer to generate, using the customer-specific version of the tool, the certificate signing request without having to manually provide the injected information.

2. The method of claim 1, wherein identifying the request from the customer for the tool comprises at least one of:
    receiving a request from the customer to purchase the digital certificate; and
    receiving a request from the customer to download the tool.

3. The method of claim 1, wherein the customer-specific version of the tool is configured to automatically open and extract the injected information upon execution.

4. The method of claim 1, further comprising, prior to creating the customer-specific version of the tool, identifying the information that uniquely identifies the customer by at least one of:
    retrieving at least a portion of the information that uniquely identifies the customer from a customer database; and
    requesting and receiving, from the customer, the information that uniquely identifies the customer in response to receiving at least one of:
    a request from the customer to purchase the digital certificate; and
    a request from the customer to download the tool.

5. The method of claim 1, further comprising, prior to creating the customer-specific version of the tool, identifying the desired encryption algorithm for the digital certificate by at least one of:
    ascertaining the desired encryption algorithm for the digital certificate from the customer's purchase history; and
    requesting and receiving, from the customer, an identification of the desired encryption algorithm for the digital certificate in response to receiving at least one of:
    a request from the customer to purchase the digital certificate; and
    a request from the customer to download the tool.

6. The method of claim 1, further comprising, prior to creating the customer-specific version of the tool, identifying the desired certificate authority for the digital certificate by at least one of:
    ascertaining the desired certificate authority from a web portal chosen by the customer when submitting the request for the tool; and ascertaining the desired certificate authority from a version of the tool requested by the customer.

7. The method of claim 1, further comprising, upon creation of the digital certificate:
identifying an additional request from the customer for an additional tool for installing the digital certificate;
creating, in response to the additional request, a customer-specific version of the additional tool that is unique to the customer and that includes the digital certificate;
configuring the customer-specific version of the additional tool to install the digital certificate using the included digital certificate; and
providing the customer-specific version of the additional tool to the customer to enable the customer to install, using the customer-specific version of the additional tool, the digital certificate without having to manually locate the digital certificate.

8. The method of claim 7, wherein the tool for generating the certificate signing request and the additional tool for installing the digital certificate comprise the same tool.

9. A system for creating customer-specific tools for generating certificate signing requests, the system comprising:
an identification module that identifies a request from a customer for a tool for generating a certificate signing request for a digital certificate;
a tool creation module that creates, in response to the request, a customer-specific version of the tool that is unique to the customer by injecting information that is necessary to generate the certificate signing request into an executable file of the customer-specific version of the tool, wherein the information:
uniquely identifies the customer; and
identifies at least one of a desired encryption algorithm for the digital certificate and a desired certificate authority for the digital certificate;
a tool configuration module that configures the customer-specific version of the tool to generate the certificate signing request using the injected information; and
a communication module that provides, to the customer, the customer-specific version of the tool that already contains the injected information necessary to generate the certificate signing request to enable the customer to generate, using the customer-specific version of the tool, the certificate signing request without having to manually provide the injected information; and
at least one processor configured to execute the identification module, the tool creation module, the tool configuration module, and the communication module.

10. The system of claim 9, wherein the identification module identifies the request from the customer for the tool by at least one of:
receiving a request from the customer to purchase the digital certificate; and
receiving a request from the customer to download the tool.

11. The system of claim 9, wherein the tool configuration module configures the customer-specific version of the tool to automatically open and extract the injected information upon execution.

12. The system of claim 9, wherein, prior to creation of the customer-specific version of the tool, the identification module identifies the information that uniquely identifies the customer by at least one of:
retrieving at least a portion of the information that uniquely identifies the customer from a customer database; and
requesting and receiving, from the customer, the information that uniquely identifies the customer in response to receiving at least one of:
a request from the customer to purchase the digital certificate; and
a request from the customer to download the tool.

13. The system of claim 9, wherein, prior to creation of the customer-specific version of the tool, the identification module identifies the desired encryption algorithm for the digital certificate by at least one of:
ascertaining the desired encryption algorithm for the digital certificate from the customer's purchase history; and
requesting and receiving, from the customer, an identification of the desired encryption algorithm for the digital certificate in response to receiving at least one of:
a request from the customer to purchase the digital certificate; and
a request from the customer to download the tool.

14. The system of claim 9, wherein, prior to creation of the customer-specific version of the tool, the identification module identifies the desired certificate authority for the digital certificate by at least one of:
ascertaining the desired certificate authority from a web portal chosen by the customer when submitting the request for the tool; and
ascertaining the desired certificate authority from a version of the tool requested by the customer.

15. The system of claim 9, wherein, upon creation of the digital certificate:
the identification module identifies an additional request from the customer for an additional tool for installing the digital certificate;
the tool creation module creates, in response to the additional request, a customer-specific version of the additional tool that is unique to the customer and that includes the digital certificate;
the tool configuration module configures the customer-specific version of the additional tool to install the digital certificate using the included digital certificate; and
the communication module provides the customer-specific version of the additional tool to the customer to enable the customer to install, using the customer-specific version of the additional tool, the digital certificate without having to manually locate the digital certificate.

16. The system of claim 15, wherein the tool for generating the certificate signing request and the additional tool for installing the digital certificate comprise the same tool.

17. A non-transitory computer-readable-storage medium comprising one or more computer-readable instructions that, when executed by at least one processor of a computing device, cause the computing device to:
identify a request from a customer for a tool for generating a certificate signing request for a digital certificate;
create, in response to the request, a customer-specific version of the tool that is unique to the customer by injecting information that is necessary to generate the certificate signing request into an executable file of the customer-specific version of the tool, wherein the information:
uniquely identifies the customer; and
identifies at least one of a desired encryption algorithm for the digital certificate and a desired certificate authority for the digital certificate;
configure the customer-specific version of the tool to generate the certificate signing request using the injected information; and
provide, to the customer, the customer-specific version of the tool that already contains the injected information necessary to generate the certificate signing request to enable the customer to generate, using the customer-specific version of the tool, the certificate signing request without having to manually provide the injected information.

18. The non-transitory computer-readable-storage medium of claim 17, wherein the one or more computer-readable instructions further cause the computing device to identify, prior to creating the customer-specific version of the tool, the information that uniquely identifies the customer by at least one of:
   retrieving at least a portion of the information that uniquely identifies the customer from a customer database; and
   requesting and receiving, from the customer, the information that uniquely identifies the customer in response to receiving at least one of:
      a request from the customer to purchase the digital certificate; and
      a request from the customer to download the tool.

19. The non-transitory computer-readable-storage medium of claim 17, wherein the one or more computer-readable instructions further cause the computing device to identify, prior to creating the customer-specific version of the tool, the desired encryption algorithm for the digital certificate by at least one of:
   ascertaining the desired encryption algorithm for the digital certificate from the customer's purchase history; and
   requesting and receiving, from the customer, an identification of the desired encryption algorithm for the digital certificate in response to receiving at least one of:
      a request from the customer to purchase the digital certificate; and
      a request from the customer to download the tool.

20. The non-transitory computer-readable-storage medium of claim 17, wherein the one or more computer-readable instructions further cause the computing device to identify, prior to creating the customer-specific version of the tool, the desired certificate authority for the digital certificate by at least one of:
   ascertaining the desired certificate authority from a web portal chosen by the customer when submitting the request for the tool; and
   ascertaining the desired certificate authority from a version of the tool requested by the customer.

\* \* \* \* \*